(12) United States Patent
Yamasaki

(10) Patent No.: US 8,954,208 B2
(45) Date of Patent: Feb. 10, 2015

(54) AERODYNAMIC COEFFICIENT ESTIMATION DEVICE AND CONTROL SURFACE FAILURE/DAMAGE DETECTION DEVICE

(75) Inventor: Koichi Yamasaki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 379 days.

(21) Appl. No.: 13/575,365

(22) PCT Filed: Mar. 16, 2011

(86) PCT No.: PCT/JP2011/056191
§ 371 (c)(1),
(2), (4) Date: Jul. 26, 2012

(87) PCT Pub. No.: WO2011/115164
PCT Pub. Date: Sep. 22, 2011

(65) Prior Publication Data
US 2012/0296500 A1 Nov. 22, 2012

(30) Foreign Application Priority Data
Mar. 18, 2010 (JP) ................................ 2010-062708

(51) Int. Cl.
*G06F 7/70* (2006.01)
*G01M 9/06* (2006.01)
(Continued)

(52) U.S. Cl.
CPC ................. *G01M 9/06* (2013.01); *G01C 23/00* (2013.01); *G05D 1/0077* (2013.01);
(Continued)

(58) Field of Classification Search
CPC .... G01C 23/00; G01C 23/005; G08G 5/0021; G08G 5/0013; G05D 1/0077
USPC ............. 703/8, 2; 244/87, 201, 36, 12.5, 215, 244/76 R, 207; 701/3, 14, 7; 416/1; 702/41, 702/182; 73/861; 473/131
See application file for complete search history.

(56) References Cited

U.S. PATENT DOCUMENTS 3,691,356 A * 9/1972 Miller .............................. 701/15
5,798,479 A * 8/1998 Bonamy ........................ 102/529
(Continued)

FOREIGN PATENT DOCUMENTS

JP 6-336199 12/1994
JP 10-167194 6/1998
(Continued)

OTHER PUBLICATIONS

Decision to Grant a Patent issued Apr. 22, 2014 in corresponding Japanese Patent Application No. 2010-062708.
(Continued)

*Primary Examiner* — Behrang Badii
(74) *Attorney, Agent, or Firm* — Wenderoth, Lind & Ponack, L.L.P.

(57) ABSTRACT

A highly reliable aerodynamic coefficient estimate can be computed, and computation of this aerodynamic coefficient estimate enables accurate detection of control surface failure/damage while reducing a discomfort for passengers. A deflection angle command signal generation means (5) generates a deflection angle command signal for estimating an aerodynamic coefficient indicating the aerodynamic characteristics of an airframe. A kinetic state quantity acquisition means (6) acquires a kinetic state quantity of the airframe that is obtained as a result of a control surface provided on the airframe being moved based on the deflection angle command signal. A candidate value calculation means (7) calculates candidate values for estimating the aerodynamic coefficient from the kinetic state quantity using two or more different estimations. An aerodynamic coefficient estimate determination means (8) determines an aerodynamic coefficient estimate based on the candidate values.

8 Claims, 6 Drawing Sheets

(51) Int. Cl.
*G01M 9/08* (2006.01)
*B64C 13/00* (2006.01)
*G01C 23/00* (2006.01)
*G05D 1/00* (2006.01)
*G08G 5/00* (2006.01)
*B64D 45/00* (2006.01)

(52) U.S. Cl.
CPC ........... *G01C 23/005* (2013.01); *G08G 5/0021* (2013.01); *G08G 5/0013* (2013.01); *B64D 2045/0085* (2013.01); *G01M 9/08* (2013.01); *B64C 13/00* (2013.01)
USPC .................................. 701/14; 701/13; 701/8

(56) References Cited

U.S. PATENT DOCUMENTS

| | | | |
|---|---|---|---|
| 8,036,783 B2 | 10/2011 | Pohl | |
| 2009/0043432 A1* | 2/2009 | Bazile | ............... 701/14 |
| 2009/0212977 A1 | 8/2009 | Pohl | |
| 2011/0004361 A1* | 1/2011 | Goupil et al. | ..................... 701/3 |
| 2013/0124177 A1* | 5/2013 | Falangas | ........................... 703/8 |

FOREIGN PATENT DOCUMENTS

| | | |
|---|---|---|
| JP | 2003-175896 | 6/2003 |
| RU | 2008 127 175 A | 1/2010 |

OTHER PUBLICATIONS

Decision to grant a patent on an invention issued Nov. 5, 2013 in corresponding Russian Application No. 2012131672/11 (049876) (with English translation).

International Search Report and Written Opinion of the International Searching Authority issued Jun. 14, 2011 in corresponding International Application No. PCT/JP2011/056191 (with English translation).

Office Action issued Oct. 8, 2013 in corresponding Japanese Application No. 2010-062708 (with English translation).

Koichi Yamazaki et al., "Kogata Hiko Jikkenki ni yoru Online Kuriki Bikeisu Suitei Algorithm no Kento", Proceedings of 47th Aircraft Symposium (CD-ROM), The Japan Society for Aeronautical and Space Sciences, Nov. 4, 2009, pp. 323-330 (with English abstract).

"Design Technologies and Production Technologies Mainly Directed to New Midsized Commercial Airplanes", tutorial paper of Aircraft, International Aircraft Development Fund, 2006, pp. 1-10 (with English translation).

"Health Monitoring Technologies for Composite Material Structures", tutorial paper of Aircraft, International Aircraft Development Fund, 2008, pp. 1-8 (with English translation).

\* cited by examiner

AERODYNAMIC COEFFICIENT ESTIMATION DEVICE AND CONTROL SURFACE FAILURE/DAMAGE DETECTION DEVICE

TECHNICAL FIELD

The present invention relates to an aerodynamic coefficient estimation device and a control surface failure/damage detection device using the aerodynamic coefficient estimation device, and particularly relates to an aerodynamic coefficient estimation device that estimates aerodynamic coefficients indicating the aerodynamic characteristics of an aircraft and a control surface failure/damage detection device that detects a failure of or damage to control surfaces of the aircraft using the estimated aerodynamic coefficients.

BACKGROUND ART

To estimate aerodynamic coefficients that indicate the aerodynamic characteristics of an aircraft, a method in which information such as the angle of attack, the angle of sideslip, the airspeed, the angular speed, the attitude angle, and the deflection angle is acquired from various sensors provided on the aircraft and computation by an iterative least square technique or a neural network technique is performed based on the acquired information is known. Moreover, a method of detecting a failure of or damage to control surfaces by comparing the thus estimated aerodynamic coefficients with the aerodynamic coefficients of the aircraft in a normal state is known.

For example, Patent Literature 1 (Japanese Unexamined Patent Application, Publication No. 2003-175896) discloses a control surface failure/damage detection device that estimates aerodynamic coefficients using the iterative least square technique, performs computation on the estimated aerodynamic coefficients using the neural network technique to calculate final aerodynamic coefficients, and detects a failure or the like of control surfaces by software based on the calculated final aerodynamic coefficients.

Also, a method in which hardware such as an optical fiber or an electric wire is laid on an aircraft to directly detect damage to control surfaces is conceivable.

CITATION LIST

Patent Literature

{PTL 1}
Japanese Unexamined Patent Application, Publication No. 2003-175896

SUMMARY OF INVENTION

Technical Problem

However, in the case where the aforementioned iterative least square technique is used to estimate aerodynamic coefficients, angular acceleration is needed in order to compute the aerodynamic coefficients. This requires an aircraft to be equipped with a sensor for detecting angular acceleration. The addition of a new sensor will cause the problem of an increase in the weight of the airframe. Moreover, estimating aerodynamic coefficients depending only on a single technique such as the iterative least square technique or the neural network technique will cause a problem in that there is a risk that accurate aerodynamic coefficient estimates cannot be obtained. Thus, when aerodynamic coefficients that have been obtained by the iterative least square technique or the neural network technique are applied to control surface failure/damage detection, erroneous detection may occur, and so there is a problem in that the detection result cannot be easily reflected in a flight control law. Furthermore, the method in which an optical fiber or the like is laid on an airframe has a problem that a failure cannot be detected even though damage can be detected.

The present invention has been made in order to solve the above-described problems, and it is an object thereof to provide an aerodynamic coefficient estimation device that can compute highly reliable aerodynamic coefficient estimates and to provide a control surface failure/damage detection device that can accurately detect control surface failure/damage by computing highly reliable aerodynamic coefficient estimates while reducing a discomfort for passengers.

Solution to Problem

In order to solve the above-described problems, the present invention employs the following solutions.

The present invention provides an aerodynamic coefficient estimation device including a deflection angle command signal generation means that generates a deflection angle command signal for estimating an aerodynamic coefficient indicating an aerodynamic characteristic of an airframe, a kinetic state quantity acquisition means that acquires a kinetic state quantity of the airframe that is obtained as a result of a control surface provided on the airframe being moved based on the deflection angle command signal, a candidate value calculation means that calculates candidate values for estimating the aerodynamic coefficient from the kinetic state quantity using two or more different estimations, and an aerodynamic coefficient estimate determination means that determines an aerodynamic coefficient estimate based on the candidate values.

With the aerodynamic coefficient estimation device of the present invention, the deflection angle command signal generation means generates a deflection angle command signal that moves control surfaces so as to impart a certain degree of motion to the airframe in order to estimate an aerodynamic coefficient, and the control surfaces are moved in accordance with the deflection angle command signal. Subsequently, the kinetic state quantity acquisition means acquires kinetic state quantities such as the angle of attack, the angle of sideslip, the airspeed, the angular speed, the attitude angle, and the deflection angle of the airframe to which the motion has been imparted as a result of the control surfaces being moved, from a sensor or the like provided on the airframe in advance. The candidate value calculation means calculates candidate values serving as candidates for calculating an aerodynamic coefficient estimate based on the kinetic state quantities using two or more different estimations, for example, two or more different estimations selected from an extended Kalman filter, an unscented Kalman filter, a Fourier transform regression technique, a neural network technique, a particle filter, and other techniques. The aerodynamic coefficient estimate determination means finally determines the aerodynamic coefficient estimate by selecting or computing the most appropriate value for the aerodynamic coefficient estimate from these candidate values. In this manner, candidate values for an aerodynamic coefficient estimate are calculated by two or more different estimations, and then the aerodynamic coefficient estimate is finally determined from the candidate values. This enables redundancy to be introduced into computation of the aerodynamic coefficient estimate and therefore a highly reliable aerodynamic coefficient to be computed.

In an aerodynamic coefficient estimation device according to a first aspect of the present invention, the aerodynamic coefficient estimate determination means determines an average or a median of the candidate values as an aerodynamic coefficient estimate.

With the aerodynamic coefficient estimation device according to the first aspect of the present invention, since an average or a median of the candidate values that have been computed by the different estimations is determined as the aerodynamic coefficient estimate, redundancy can be introduced into computation of the aerodynamic coefficient estimate, and therefore, a highly reliable aerodynamic coefficient can be computed.

In an aerodynamic coefficient estimation device according to a second aspect of the present invention, the aerodynamic coefficient estimate determination means determines a candidate value corresponding to one of the reproduced values of the kinetic state quantity that are computed respectively based on the candidate values as an aerodynamic coefficient estimate, the one reproduced value being the closest to the kinetic state quantity.

With the aerodynamic coefficient estimation device according to the second aspect of the present invention, a reproduced value of the kinetic state quantity can be computed using each candidate value. Thus, the reproduced values of the kinetic state quantity obtained from the respective candidate values are compared with the actual kinetic state quantity acquired by the kinetic state quantity acquisition means, and the candidate value corresponding to the reproduced value that is the closest to the actual kinetic state quantity is determined as the aerodynamic coefficient estimate. This enables redundancy to be introduced into computation of the aerodynamic coefficient estimate and therefore a highly reliable aerodynamic coefficient to be computed.

Moreover, a control surface failure/damage detection device of the present invention includes a failure/damage possibility judging means that judges the possibility of control surface failure/damage and a control surface failure/damage detection means that detects which control surface suffers a failure or damage based on an aerodynamic coefficient estimate estimated by the aerodynamic coefficient estimation device if the failure/damage possibility judging means judges that there is a possibility that control surface failure/damage may occur.

With the control surface failure/damage detection device of the present invention, if it is judged that there is a possibility that control surface failure/damage may occur, an aerodynamic coefficient estimate is calculated, and which control surface suffers the failure or damage is detected based on this estimate. Thus, a failure of or damage to a control surface can be accurately detected by continuously monitoring control surface failure/damage while minimizing unwanted motion such as unwanted swaying of the airframe and thereby reducing the discomfort for the passengers.

In the control surface failure/damage detection device according to a first aspect of the present invention, the failure/damage possibility judging means includes another deflection angle command generation unit that generates a deflection angle command signal for moving the control surface such that the airframe makes no motion and another kinetic state quantity acquisition means that acquires a kinetic state quantity of the airframe that is obtained as a result of the control surface provided on the airframe being moved based on the deflection angle command signal, and the possibility of control surface failure/damage is judged based on the kinetic state quantity.

With the control surface failure/damage detection device according to the first aspect of the present invention, to judge the possibility of control surface failure/damage, the other deflection angle command generation unit generates a deflection angle command signal for controlling the control surfaces using a combination of deflection angles that does not impart any motion to the airframe. The other kinetic state quantity acquisition means acquires a kinetic state quantity of the airframe that is obtained as a result of the control surfaces being moved in accordance with the deflection angle command signal that has been generated in order to judge the possibility of control surface failure/damage. At this time, if it can be judged from the obtained kinetic state quantity that the airframe makes a motion when the airframe normally should not make a motion, the failure/damage possibility judging means judges that there is a possibility that control surface failure/damage may occur based on the kinetic state quantity. As described above, the airframe makes no motion if there is no possibility that control surface failure/damage may occur. Thus, a failure of or damage to a control surface can be accurately detected by continuously or periodically monitoring control surface failure/damage while minimizing unwanted motion such as unwanted swaying of the airframe and thereby reducing the discomfort for the passengers.

In the control surface failure/damage detection device according to a second aspect of the present invention, the failure/damage possibility judging means includes still another deflection angle command signal generation means that generates a deflection angle command signal for changing or maintaining the airframe to or in a desired attitude, still another kinetic state quantity acquisition means that acquires a kinetic state quantity of the airframe during a flight based on the deflection angle command signal, and a kinetic state quantity prediction means that computes a kinetic state quantity predictive value representing a kinetic state quantity that is predicted assuming that the airframe is in a normal state, and the possibility of control surface failure/damage is judged based on the kinetic state quantity and the kinetic state quantity predictive value.

With the control surface failure/damage detection device according to the second aspect of the present invention, the possibility of control surface failure/damage is judged based on the actual kinetic state quantity during the flight and the kinetic state quantity predictive value that is predicted assuming that the airframe is in the normal state. Thus, a failure of or damage to a control surface can be accurately detected by continuously monitoring control surface failure/damage while minimizing unwanted motion such as unwanted swaying of the airframe and thereby reducing the discomfort for the passengers.

A control surface failure/damage detection device according to a third aspect of the present invention includes an optical fiber or an electric wire laid on the airframe and a detection means that detects an abnormality of the optical fiber or the electric wire, wherein the failure/damage possibility judging means includes still another deflection angle command signal generation means that generates a deflection angle command signal for changing or maintaining the airframe to or in a desired attitude, a deflection angle acquisition means that acquires a deflection angle that is obtained as a result of the control surfaces provided on the airframe being moved based on the deflection angle command signal, and a deflection angle prediction means that computes a deflection angle predictive value representing a deflection angle that is predicted based on the deflection angle command signal assuming that the airframe is in a normal state, and the possibility of damage to the control surface is judged based on the detection result of the detection means, and the possibility of a failure of the control surface is judged based on the deflection angle and the deflection angle predictive value.

With the control surface failure/damage detection device according to the third aspect of the present invention, the possibility of control surface damage is judged based on the abnormality detection result obtained from the optical fiber or the electric wire, and the possibility of control surface failure is judged based on the actual deflection angle during the flight and the deflection angle predictive value that is predicted assuming that the airframe is in the normal state. Thus, a failure of or damage to a control surface can be accurately detected by continuously monitoring control surface failure/damage while minimizing unwanted motion such as unwanted swaying of the airframe and thereby reducing the discomfort for the passengers.

In a control surface failure/damage detection device according to a fourth aspect of the present invention, the control surface failure/damage detection means detects control surface failure/damage by comparing the aerodynamic coefficient estimate with either an aerodynamic coefficient estimate of the airframe in the normal state or an aerodynamic coefficient estimate that was obtained when failure/damage detection was performed the previous time.

With the control surface failure/damage detection device according to the fourth aspect of the present invention, the aerodynamic coefficient estimate of the airframe in the normal state and a previously calculated aerodynamic coefficient value are successively stored in advance and are used for comparison during control surface failure/damage detection. Thus, if a failure of or damage to a control surface worsens, the failure of or damage to the control surface could be accurately detected.

Advantageous Effects of Invention

As described above, highly reliable aerodynamic coefficient estimates can be computed while reducing the discomfort for the passengers, and the use of the computed aerodynamic coefficient estimates enables accurate detection of control surface failure/damage.

DESCRIPTION OF EMBODIMENTS

First Embodiment

Hereinafter, an aerodynamic coefficient estimation device according to a first embodiment of the present invention will be described with reference to the drawings.

Figure 1:
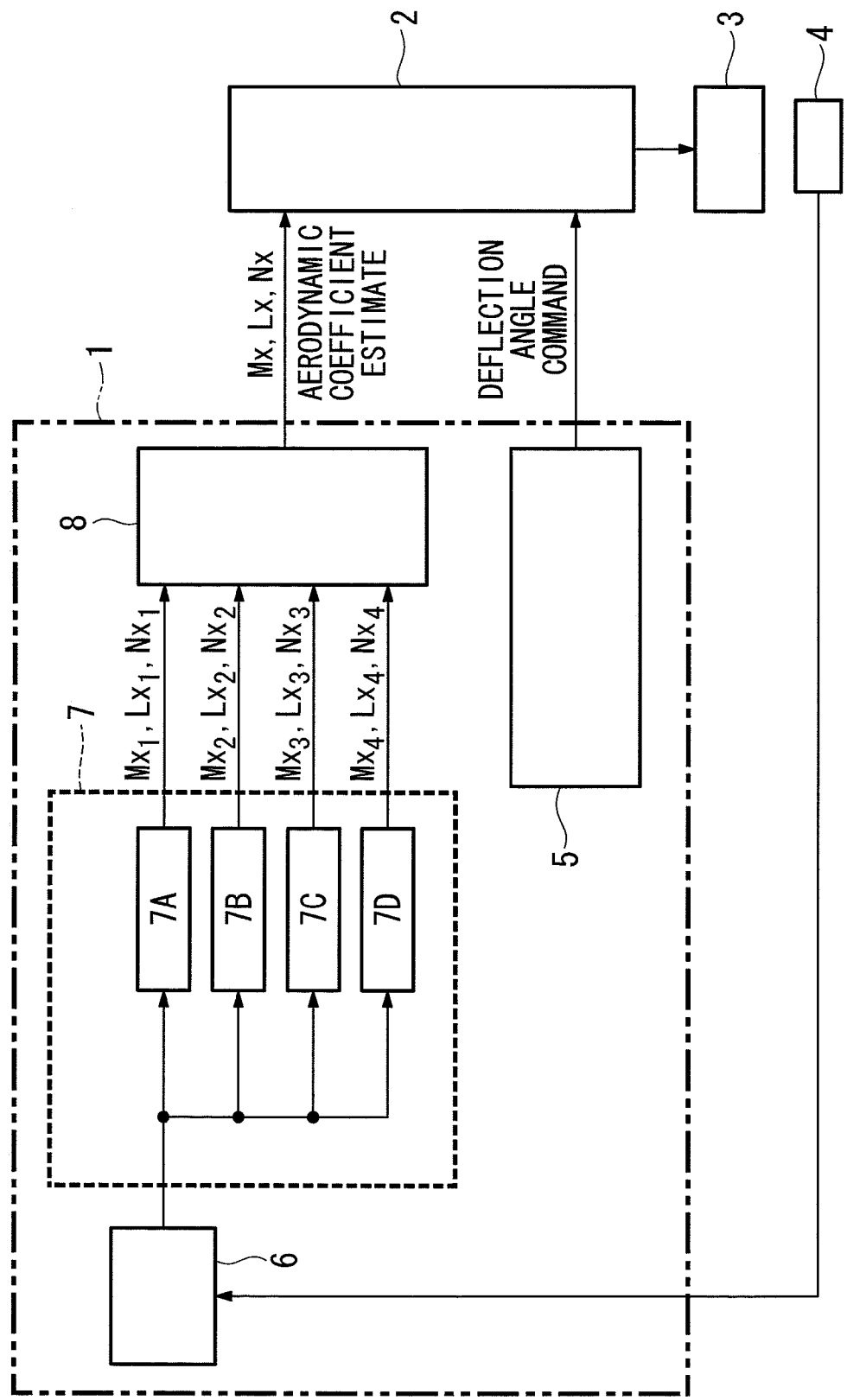
FIG. 1 is a block diagram schematically showing the configuration of an aerodynamic coefficient estimation device according to a first embodiment of the present invention.

FIG. 1 is a block diagram schematically showing the configuration of the aerodynamic coefficient estimation device according to the first embodiment. An aerodynamic coefficient estimation device 1 is a device that estimates aerodynamic coefficients indicating the aerodynamic characteristics of an aircraft, and is applied to an aircraft as illustrated in FIG. 1 and connected to a flight control system 2 that controls an airframe of the aircraft, control surfaces 3 that generate an aerodynamic force for controlling the attitude of the airframe, and a sensor 4 that detects kinetic state quantities of the airframe.

The flight control system 2 is a system that performs overall control of the aircraft, and configures a flight control law in accordance with the state of the airframe or of a flight and reconfigures the flight control law based on aerodynamic coefficient estimates estimated by the aerodynamic coefficient estimation device 1. Then, the flight control system 2 outputs a control signal to various types of equipment (not shown) provided on the aircraft in conformity with the flight control law.

The control surfaces 3 include an elevator that moves the nose of the aircraft up or down, a rudder that changes the direction that the nose of the aircraft is pointing to left or right, an aileron that banks the airframe left or right, and a high-lift device (flap) that rectifies the airfoil of a main wing to increase lift. An actuator system, which is not shown, moves the control surfaces 3 in accordance with a deflection angle command signal, which will be described later, via the flight control system. The attitude of the airframe is controlled by an aerodynamic force as a result of the control surfaces 3 being moved.

The sensor 4 includes various sensors such as an air data sensor, an inertial sensor, and a deflection angle sensor. The sensor 4 acquires sensor information related to various kinetic state quantities regarding the kinetic state of the airframe such as the angle of attack, the angle of sideslip, the airspeed, the angular speed, the attitude angle, and the deflection angle of the airframe and outputs the acquired sensor information to a sensor information acquisition unit 6.

The aerodynamic coefficient estimation device 1 includes a deflection angle command signal generation unit (deflection angle command signal generation means) 5, the sensor information acquisition unit (kinetic state quantity acquisition means) 6, a candidate value calculation unit (candidate value calculation means) 7, and an aerodynamic coefficient estimate determination unit (aerodynamic coefficient estimate determination means) 8.

The deflection angle command signal generation unit 5 generates a deflection angle command signal that moves the control surfaces 3 so as to impart a certain degree of motion to the airframe in order to estimate the aerodynamic coefficients, and outputs the generated deflection angle command signal to the flight control system 2 in order for the control surfaces 3 to be moved in accordance with the deflection angle command signal. Moreover, the flight control system 2, during a flight of the aircraft, generates a deflection angle command signal for changing or maintaining the airframe to or in a desired attitude, superimposes the deflection angle command signal generated by the deflection angle command signal generation unit 5 on this deflection angle command signal, and outputs the resultant superimposed signal to the actuator system, which is not shown.

The sensor information acquisition unit 6 acquires, via the sensor 4, kinetic state quantities of the airframe that are obtained as a result of the control surface 3 being moved in accordance with the deflection angle command signal and outputs the acquired kinetic state quantities to the candidate value calculation unit 7, which will be described later.

The candidate value calculation unit 7 includes a computing device 7A that stores an algorithm based on the extended Kalman filter, a computing device 7B that stores an algorithm based on the unscented Kalman filter, a computing device 7C that stores an algorithm based on the Fourier transform regression technique, and a computing device 7D that stores an algorithm based on the neural network technique, and the computing devices 7A to 7D are adapted to individually calculate a candidate value for estimating the aerodynamic coefficients from the sensor information based on the respective stored algorithms. The candidate value calculation unit 7 outputs the candidate values calculated by the computing devices 7A to 7D to the aerodynamic coefficient estimate determination unit 8. Here, the candidate value calculation unit 7 may have a configuration in which all of the computing devices 7A to 7D are used to individually compute the candidate values, or may have a configuration in which two or three of the computing devices 7A to 7D are used to individually compute the candidate values. Furthermore, candidate value calculation by the computing devices 7A to 7D is not limited to calculation based the algorithms related to the above-described four estimations, and for example, algorithms related to other estimations such as a particle filter can also be applied.

It should be noted that specific operation expressions and the like based on the estimations for calculating candidate values by the computing devices 7A to 7C have already been made public by the inventor of the present invention at, for example, a symposium held by the Japan Society for Aeronautical and Space Sciences (reference number: JSASS-2009-5057) and are known, and therefore, a further description thereof is not given here.

The aerodynamic coefficient estimate determination unit 8 determines an aerodynamic coefficient estimate from a plurality of candidate values calculated in the candidate value calculation unit 7. Specifically, an average or a median of the candidate values is computed, and the computed average or median can be finally determined as an aerodynamic coefficient estimate. Beside this, it is possible to compute reproduced values of the sensor information corresponding to the candidate values, respectively, using the candidate values and compare the reproduced values with the sensor information, thereby determining a candidate value corresponding to a reproduced value that matches or is the closest to the sensor information as the aerodynamic coefficient estimate. The determined aerodynamic coefficient estimate is output to the flight control system 2.

Hereinafter, a process for calculating aerodynamic coefficient estimates by the aerodynamic coefficient estimation device 1 having the above-described configuration will be described with reference to a flowchart in FIG. 2.

Figure 2:
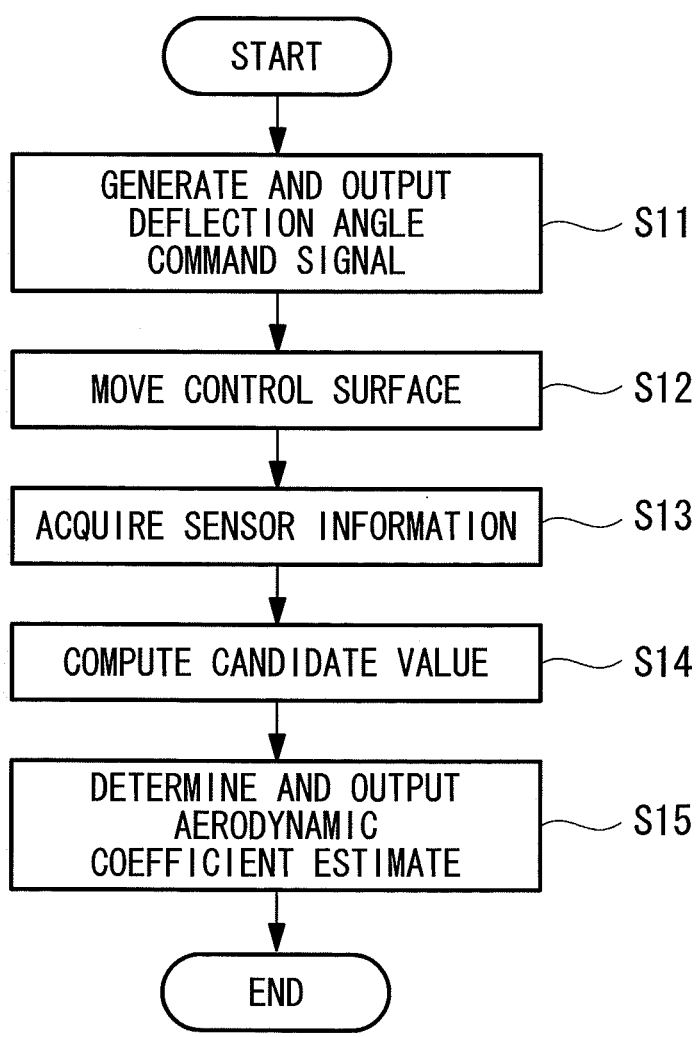
FIG. 2 is a flowchart illustrating a process for estimating aerodynamic coefficients by the aerodynamic coefficient estimation device according to the first embodiment of the present invention.

In step S11 in FIG. 2, the deflection angle command signal generation unit 5 generates a deflection angle command signal that moves the control surfaces 3 so as to impart a certain degree of motion to the airframe in order to estimate aerodynamic coefficients and outputs the generated deflection angle command signal to the flight control system 2. Then, the process proceeds to the next step S12. In step S12, the flight control system 2 generates a deflection angle command signal for changing or maintaining the airframe to or in a desired attitude, superimposes the deflection angle command signal that has been generated by the deflection angle command signal generation unit 5 on this deflection angle command signal, and outputs the resultant superimposed deflection angle command signal to the actuator system, which is not shown, and the actuator system moves the control surfaces 3 in accordance with the deflection angle command signal.

In step S13, since the control surfaces 3 have been moved in the previous step S12 and the airframe thus makes a motion such as swaying in accordance with the deflection angle command signal, kinetic state quantities of the airframe that are continuously or periodically acquired by the sensor 4 change. The sensor 4 detects the resulting kinetic state quantities as the sensor information and outputs the sensor information to the sensor information acquisition unit 6.

In step S14, the computing devices 7A of 7D of the candidate value calculation unit 7 individually compute candidate values, and the computation results are output to the aerodynamic coefficient estimate determination unit 8. In the subsequent step S15, the aerodynamic coefficient estimate determination unit 8 determines the final aerodynamic coefficient estimates based on the candidate values received from the candidate value calculation unit 7 and outputs the determined aerodynamic coefficient estimates to the flight control system 2. Thus, the present routine is ended. The flight control system 2 can reconfigure the flight control law in response to the input of the aerodynamic coefficient estimates.

In this manner, with the computing devices 7A to 7D, candidate values for estimating aerodynamic coefficient estimates are calculated based on two or more different estimations, and then, the final aerodynamic coefficient estimates are determined from the candidate values. This enables redundancy to be introduced into computation of the aerodynamic coefficient estimates and therefore highly reliable aerodynamic coefficients to be computed. Moreover, since the extended Kalman filter, the unscented Kalman filter, the Fourier transform regression technique, and the neural network technique that are applied to the computing devices 7A to 7D do not require angular acceleration of the airframe as the sensor information that is necessary in calculation of the candidate values, there is no need to provide the airframe with a sensor for detecting angular acceleration, and therefore, an increase in the weight of the airframe can be avoided.

Second Embodiment

Hereinafter, a control surface failure/damage detection device according to a second embodiment of the present invention will be described with reference to the drawings.

Figure 3:
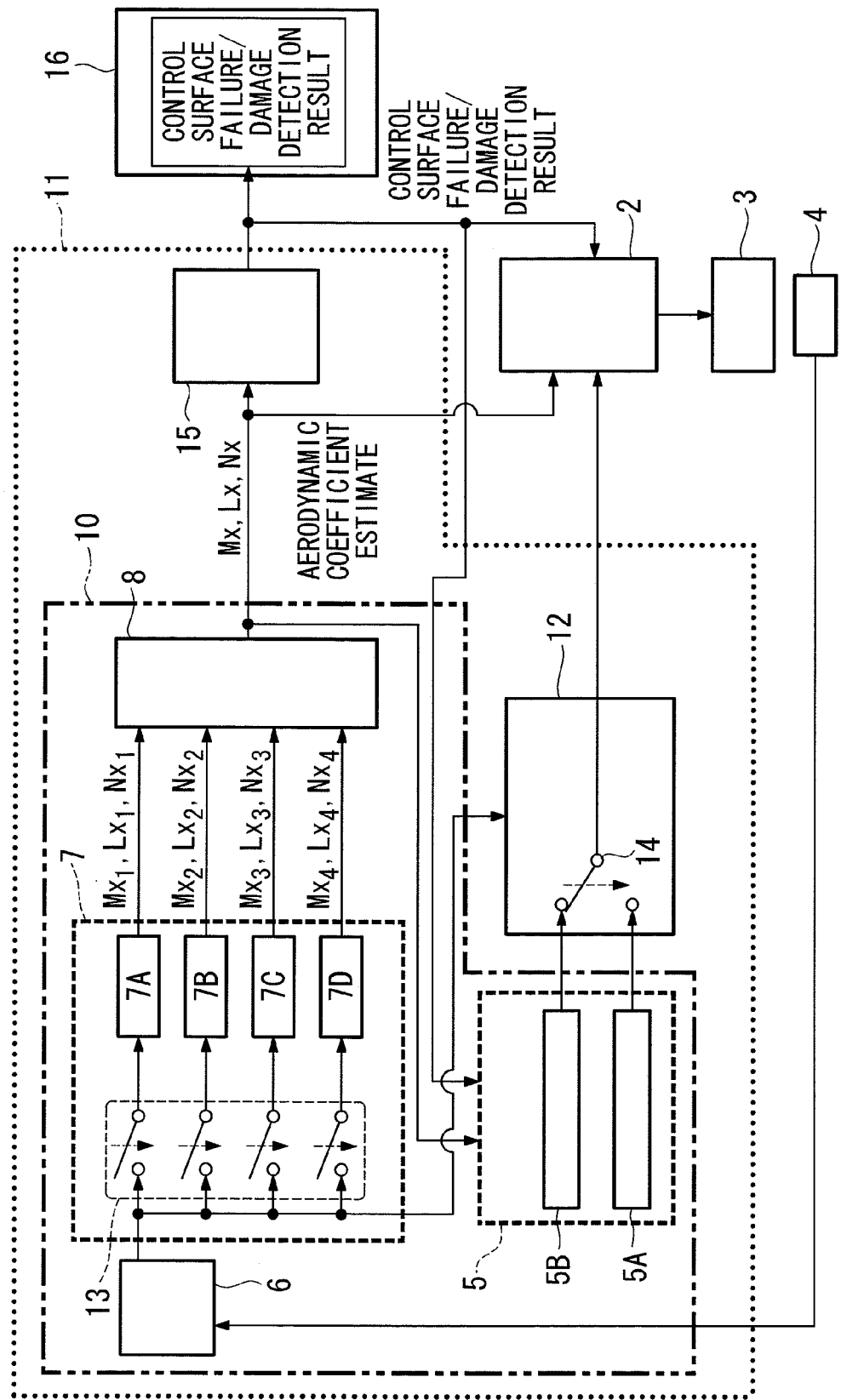
FIG. 3 is a block diagram schematically showing the configuration of a control surface failure/damage detection device according to a second embodiment of the present invention.

FIG. 3 is a block diagram schematically showing the configuration of the control surface failure/damage detection device according to the second embodiment. A control surface failure/damage detection device 11 is a device that detects a failure of or damage to the control surfaces 3 of an aircraft, and detects a failure of a control surface, that is, for example, a situation in which the control surface can no longer respond to the deflection angle command value or can no longer move (is immobilized), or damage to a control surface, that is, for example, a situation in which the control surface is partially or entirely destroyed. For this purpose, as shown in FIG. 3, the control surface failure/damage detection device 11 includes a failure/damage possibility judging unit 12 and a control surface failure/damage detection unit 15 in addition to an aerodynamic coefficient estimation device 10. Moreover, the control surface failure/damage detection device 11 is applied to the aircraft and connected to the flight control system 2 that controls the airframe of the aircraft, the sensor 4 that detects kinetic state quantities of the airframe, and a display device 16 that is provided in a cockpit or the like of the aircraft.

The aerodynamic coefficient estimation device 10 included in the control surface failure/damage detection device 11 has the same configuration as the aerodynamic coefficient estimation device 1 of the first embodiment, but differs from the aerodynamic coefficient estimation device 1 in that it is provided with a configuration for application to the control surface failure/damage detection device 11. Hereinafter, a further description of the same configuration as the aerodynamic estimation device 1 will be omitted, and the different configuration will be described.

Specifically, the deflection angle command signal generation unit 5 generates a deflection angle command signal for aerodynamic coefficient estimation that moves the control surfaces 3 so as to impart a certain degree of motion to the airframe in order to estimate the aerodynamic coefficients, and also generates, based on either aerodynamic coefficients during a normal flight that have been stored in advance or aerodynamic coefficient estimates that were obtained when failure/damage was detected the previous time, a deflection angle command signal (Tkern) for checking failure/damage for moving the control surfaces using a combination of deflection angles that does not impart any motion to the airframe in order to judge the possibility of control surface failure/damage. For this purpose, the deflection angle command signal generation unit 5 includes an aerodynamic coefficient estimation steering device 5A that generates a deflection angle command signal for aerodynamic coefficient estimation and a failure/damage checking steering device 5B that generates a deflection angle command signal for checking failure/damage. Moreover, the flight control system 2 generates a deflection angle command signal for changing or maintaining the airframe to or in a desired attitude during a flight of the aircraft, superimposes a deflection angle command signal generated by the deflection angle command signal generation unit 5 on this deflection angle command signal, and outputs the resultant superimposed deflection angle command signal to the actuator system.

To compute aerodynamic coefficient estimates if the failure/damage possibility judging unit 12, which will be described later, judges that there is a possibility of failure/damage, the aerodynamic coefficient estimation device 10 includes a changeover switch 13 that is provided in the candidate value calculation unit 7 so that the sensor information is input only if the failure/damage possibility judging unit 12 judges that failure/damage may occur.

The failure/damage possibility judging unit 12 is connected to the sensor information acquisition unit 6, the deflection angle command signal generation unit 5, and the flight control system 2 and can exchange various types of information with the sensor information acquisition unit 6, the deflection angle command signal generation unit 5, and the flight control system 2. The failure/damage possibility judging unit 12 also includes a changeover switch 14 at an interface with the deflection angle command signal generation unit 5, and this switch performs switching to allow the failure/damage possibility judging unit 12 to receive a deflection angle command signal from the failure/damage checking steering device 5B when judging the possibility of control surface failure/damage and to receive a deflection angle command signal from the aerodynamic coefficient estimation steering device 5A if it is judged that control surface failure/damage may occur.

To judge the possibility of failure/damage, the failure/damage possibility judging unit 12 accepts input of a deflection angle command signal for checking failure/damage that has been output from the failure/damage checking steering device 5B, and outputs the deflection angle command signal for checking failure/damage to the flight control system 2. The failure/damage possibility judging unit 12 acquires the sensor information that is obtained as a result of the control surfaces 3 being moved in accordance with this deflection angle command signal for checking failure/damage, from the sensor information acquisition unit 6, and judges whether or not there is a possibility that any of the control surfaces 3 may suffer failure/damage by, for example, comparing the acquired sensor information with a preset threshold. If it is judged that there is a possibility that any control surface may suffer failure/damage, the failure/damage possibility judging unit 12 accepts input of a deflection angle command signal for aerodynamic coefficient estimation from the aerodynamic coefficient estimation steering device 5A and outputs the deflection angle command signal for aerodynamic coefficient estimation to the flight control system 2.

It should be noted that the operation of the changeover switch 13 and the operation of the changeover switch 14 are linked together, and when the changeover switch 14 connects the failure/damage possibility judging unit 12 to the failure/damage checking steering device 5B, the changeover switch 13 is switched off, so that the sensor information is not input to the computing devices 7A to 7D. When the changeover switch 14 connects the failure/damage possibility judging unit 12 to the aerodynamic coefficient estimation steering device 5A, the switch 13 is switched on, so that the sensor information is input to the computing devices 7A to 7D.

If it is judged that there is a possibility that any of the control surfaces 3 may suffer failure/damage, the control surface failure/damage detection unit 15 receives input of aerodynamic coefficient estimates computed by the aerodynamic coefficient estimation device 10 and detects which control surface suffers the failure/damage based on the aerodynamic coefficient estimates. To detect failure/damage, for example, the control surface failure/damage detection unit 15 stores aerodynamic coefficients during a normal flight of the aircraft in advance and compares these aerodynamic coefficients with the aerodynamic coefficients output from the aerodynamic coefficient estimation device 10. Thus, which control surface suffers the failure/damage can be detected based on the comparison result. Moreover, for example, if a failure of or damage to the control surface worsens, it is possible to compare the aerodynamic coefficient estimates with aerodynamic coefficient estimates that were obtained when the failure/damage was detected the previous time and detect the failure of or damage to the control surface based on the comparison result. The control surface failure/damage detection result is output to the flight control system 2, the deflection angle command signal generation unit 5, and the display device 16.

Once the control surface failure/damage detection result and the aerodynamic coefficient estimates have been input, the deflection angle command signal generation unit 5 reflects and then uses the failure/damage portion and the like to generate a deflection angle command signal the next time and thereafter, while the flight control system 2 determines whether or not to use the control surface suffering the failure/damage based on the control surface failure/damage detection result and the aerodynamic coefficient estimates and depending on the extent of the failure of or damage to the control surface, and reconfigures the flight control law. Moreover, since the display device 16 receives the control surface failure/damage detection result, it informs a pilot and the like of which control surface suffers the failure/damage.

Figure 4:
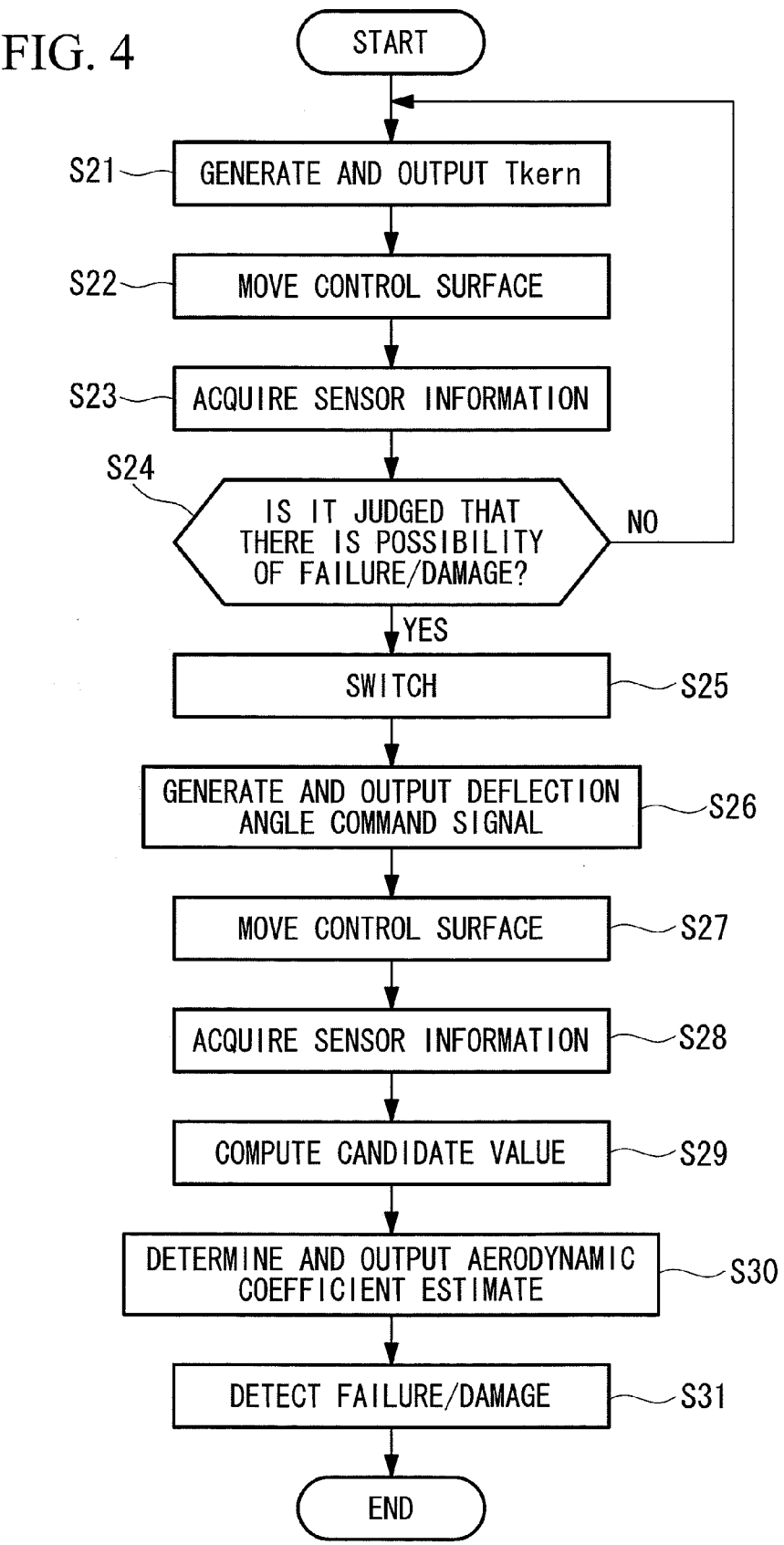
FIG. 4 is flowchart illustrating a process for judging control surface failure/damage by the control surface failure/damage detection device according to the second embodiment of the present invention.

Hereinafter, a process for judging control surface failure/damage by the thus configured control surface failure/damage detection device 11 will be described with reference to a flowchart in FIG. 4.

During a normal flight of the aircraft, the changeover switch 14 connects the failure/damage checking steering device 5B to the failure/damage possibility judging unit 12, and the possibility of failure/damage is continuously or periodically judged. Thus, in step S21 in FIG. 4, the deflection angle command signal generation unit 5 continuously or periodically generates and outputs a deflection angle command signal (Tkern) for checking failure/damage to the failure/damage possibility judging unit 12. The deflection angle command signal for checking failure/damage is output to the flight control system 2 via the failure/damage possibility judging unit 12. In the next step S22, the deflection angle command signal is superimposed on a deflection angle command signal for changing or maintaining the airframe to or in a desired attitude, which is generated by the flight control system 2, and the control surfaces 3 are moved by the actuator system, which is not shown, based on the resultant superimposed deflection angle command signal.

In step S23, the sensor 4 continuously or periodically acquires kinetic state quantities of the airframe as the sensor information, and the sensor 4 outputs the sensor information to the sensor information acquisition unit 6. The sensor information is output from the sensor information acquisition unit 6 to the failure/damage possibility judging unit 12, which judges whether or not there is a possibility that failure/damage may occur in step S24. The failure/damage possibility judging unit 12 assumes that even when the control surfaces 3 are moved in accordance with the deflection angle command signal for checking failure/damage, the airframe normally should not make a motion. If it can be judged from the sensor information acquired from the sensor 4 that the airframe makes a motion such as swaying, the failure/damage possibility judging unit 12 judges that there is a possibility that control surface failure/damage may occur. Then, the process proceeds to the next step S25. On the other hand, if it can be judged from the sensor information that the airframe does not make a motion such as swaying, the failure/damage possibility judging unit 12 judges that there is no possibility that failure/damage may occur. Judgement in step S24 is periodically repeated.

In step S25, since the failure/damage possibility judging unit 12 has judged that there is a possibility that control surface failure/damage may occur, the changeover switch 13 and the changeover switch 14 are changed in order that the aerodynamic coefficient estimation device 10 estimates the aerodynamic coefficients. As a result, the failure/damage possibility judging unit 12 is connected to the aerodynamic coefficient estimation steering device 5A, and the sensor information acquisition unit 6 is connected to each of the computing devices 7A to 7B. In the next step S26, a deflection angle command signal for aerodynamic coefficient estimation is generated by the aerodynamic coefficient estimation steering device 5A and output to the flight control system 2. Then, the process proceeds to the next step S27. In step S27, the flight control system 2 generates a deflection angle command signal for changing or maintaining the airframe to or in a desired attitude, superimposes the deflection angle command signal generated by the deflection angle command signal generation unit 5 on this deflection angle command signal, and outputs the resultant superimposed deflection angle command signal to the actuator system, and the actuator system moves the control surfaces 3 in accordance with the deflection angle command signal for aerodynamic coefficient estimation.

In step S28, since the control surfaces 3 have been moved in the previous step S27 and the airframe thus makes a motion such as swaying in accordance with the deflection angle command signal, the kinetic state quantities of the airframe that are continuously or periodically acquired by the sensor 4 change. The sensor 4 detects the resulting kinetic state quantities as the sensor information and outputs the sensor information to the sensor information acquisition unit 6.

In step S29, the computing devices 7A to 7D of the candidate value calculation unit 7 individually compute candidate values, and the computation results are output to the aerodynamic coefficient estimate determination unit 8. In the next step S30, the aerodynamic coefficient estimate determination unit 8 determines the final aerodynamic coefficient estimates based on the candidate values input from the candidate value calculation unit 7 and outputs the determined aerodynamic coefficient estimates to the control surface failure/damage detection unit 15, the deflection angle command signal generation unit 5, and the flight control system 2. Furthermore, in step S31, the control surface failure/damage detection unit 15 detects which control surface suffers the failure/damage based on the aerodynamic coefficient estimates. The control surface failure/damage detection result is output to the flight control system 2, the deflection angle command signal generation unit 5, and the display device 16, and the present routine is ended.

As described above, to detect control surface failure/damage, the possibility of failure/damage is judged in advance, and if it is judged that there is a possibility that control surface failure/damage may occur, aerodynamic coefficient estimates are calculated, and which control surface suffers the failure/damage is detected based on the aerodynamic coefficient estimates. Thus, a failure of or damage to a control surface can be accurately detected by continuously monitoring control surface failure/damage while minimizing unwanted motion such as unwanted swaying of the airframe and thereby reducing the discomfort for the passengers. To estimate aerodynamic coefficients in order to detect failure/damage, candidate values for estimating the aerodynamic coefficient estimates are calculated based on two or more different estimations by using the computing devices 7A to 7D, and after that, aerodynamic coefficient estimates are finally determined based on the candidate values. This enables redundancy to be introduced into estimation of aerodynamic coefficient estimates and therefore highly reliable aerodynamic coefficients to be computed.

Modification of Second Embodiment

Hereinafter, a control surface failure/damage detection device according to a modification of the second embodiment will be described with reference to FIG. 5.

Figure 5:
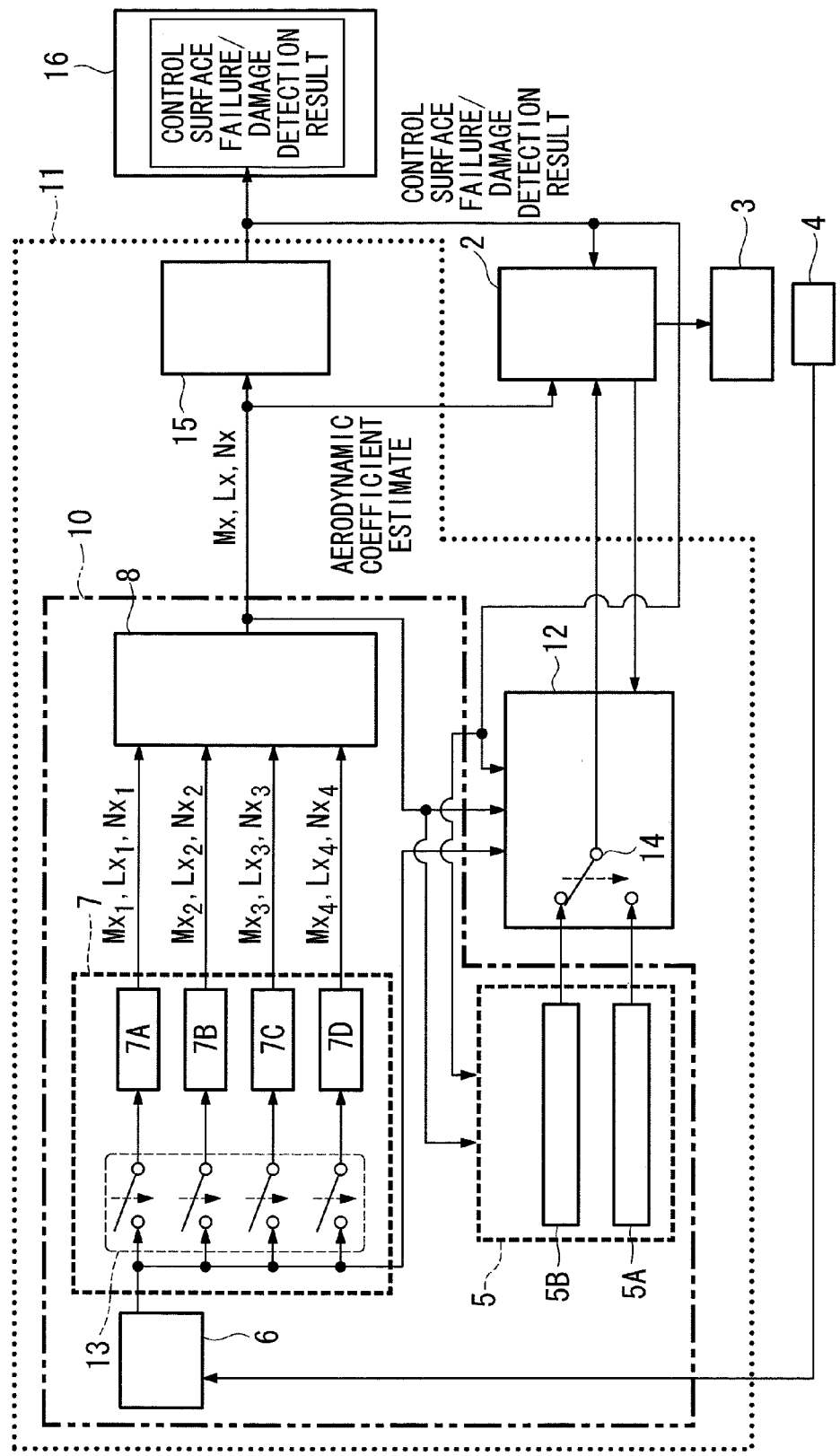
FIG. 5 is a block diagram schematically showing the configuration of a control surface failure/damage detection device according to a modification of the second embodiment of the present invention.

FIG. 5 is a block diagram schematically showing the configuration of the control surface failure/damage detection device according to the present modification. The control surface failure/damage detection device of the present modification differs from the control surface failure/damage detection device according to the second embodiment in that, regardless of whether or not a deflection angle command signal for checking failure/damage has been output, it computes kinetic state quantity predictive values assuming that the airframe is in the normal state and judges the possibility of failure/damage based on the kinetic state quantity predictive values and the actual kinetic state quantities of the airframe. The control surface failure/damage detection device is therefore not necessarily required to include the failure/damage checking steering device 5B. Since the other configuration is the same as the configuration of the above-described control surface failure/damage detection device, a further description thereof will be omitted, and only the differences will be described below.

The failure/damage possibility judging unit 12 is connected to the sensor information acquisition unit 6, the deflection angle command signal generation unit 5, the aerodynamic coefficient estimate determination unit 8, the flight control system 2, and the control surface failure/damage detection unit 15 and can exchange various types of information with these units. The failure/damage possibility judging unit 12 stores an airframe motion model in advance. Here, an airframe motion model refers to a mathematical model that can be obtained during design of an aircraft to which the control surface failure/damage detection device can be applied and that expresses motions of the aircraft. When the airframe is in the normal state, the kinetic state quantities of the airframe can be computed from the airframe motion model. For this reason, during a flight of the aircraft, the failure/damage possibility judging unit 12 continuously or periodically computes kinetic state quantity predictive values representing the kinetic state quantities that are predicted assuming that the airframe is in the normal state, based on the airframe motion model and either a deflection angle command signal for changing or maintaining the airframe to or in a desired attitude during the flight of the aircraft or a superimposed deflection angle command signal obtained by superimposing a deflection angle command signal for checking failure/damage on this deflection angle command signal, which is generated by the flight control system 2. At the same time, the failure/damage possibility judging unit 12 acquires the actual kinetic state quantities of the airframe during the flight based on either the deflection angle command signal for changing or maintaining the airframe attitude during the flight of the aircraft or the superimposed deflection angle command signal obtained by superimposing the deflection angle command signal for checking failure/damage on this deflection angle command signal, which is generated by the flight control system 2, as the sensor information from the sensor information acquisition unit 6.

To judge the possibility of failure/damage, the failure/damage possibility judging unit 12 acquires the sensor information that is obtained as a result of the control surfaces 3 being moved in accordance with either the deflection angle command signal for changing or maintaining the attitude of the airframe or the superimposed deflection angle command signal obtained by superimposing the deflection angle command signal for checking failure/damage on this deflection angle command signal, which has been output from the flight control system 2, from the sensor information acquisition unit 6. Then, the failure/damage possibility judging unit 12 compares the computed kinetic state quantity predictive values with the sensor information and judges whether or not there is a possibility that any of the control surfaces 3 may suffer failure/damage based on the difference between the predictive values and the sensor information.

That is to say, if the difference exceeds a predetermined threshold, it is judged that there is a possibility that any of the control surfaces 3 may suffer failure/damage, and if the difference does not exceed the threshold, it is judged that there is no possibility that any of the control surfaces 3 may suffer failure/damage. If it is judged that there is a possibility that control surface failure/damage may occur, the failure/damage possibility judging unit 12 accepts input of a deflection angle command signal for aerodynamic coefficient estimation from the aerodynamic coefficient estimation steering device 5A and outputs the deflection angle command signal for aerodynamic coefficient estimation to the flight control system 2.

Then, the aerodynamic coefficient estimation device 10 estimates the aerodynamic coefficients, and the control surface failure/damage detection unit 15 detects a failure of or damage to the control surfaces 3.

If it is detected that the control surfaces 3 suffer a failure or damage, the detection result is output to the flight control system 2, the display device 16, the deflection angle command signal generation unit 5, and the failure/damage possibility judging unit 12. The deflection angle command signal generation unit 5 and the failure/damage possibility judging unit 12 accumulate the failure/damage detection result and the aerodynamic coefficient estimates in case the failure of or damage to the control surfaces 3 worsens, and reflects the accumulated detection result and aerodynamic coefficient estimates in the next judgement of the possibility of failure/damage. That is to say, the failure/damage detection result and the aerodynamic coefficient estimates that have already been obtained are reflected in computation of kinetic state quantity predictive values based on the airframe motion model, and the resulting predictive values are compared with the actual kinetic state quantities. Thus, if the failure of or damage to the control surfaces 3 worsens, the worsening of the failure or damage could be detected.

As described above, the possibility of control surface failure/damage is judged based on actual kinetic state quantities during a flight and kinetic state quantity predictive values that are predicted assuming that the airframe is in the normal state. Thus, a failure of or damage to a control surface can be accurately detected by continuously monitoring control surface failure/damage while minimizing unwanted motion such as unwanted swaying of the airframe and thereby reducing the discomfort for the passengers.

Other Modifications of Second Embodiment

Hereinafter, a control surface failure/damage detection device according to another modification of the second embodiment will be described. It should be noted that a schematic configuration of the control surface failure/damage detection device according to this modification is substantially similar to that of the control surface failure/damage detection device according to the above-described modification of the second embodiment shown in FIG. 5 and will therefore be described with reference to FIG. 5.

The control surface failure/damage detection device of the present modification differs from the control surface failure/damage detection device according to the second embodiment in the following respects. First, the airframe is provided with an optical fiber or an electric wire, with which a control surface abnormality is detected. Second, regardless of whether or not a deflection angle command signal for checking failure/damage has been output, either a deflection angle command signal for changing or maintaining the airframe to or in a desired attitude or a superimposed deflection angle command signal obtained by superimposing a deflection angle command signal for checking failure/damage on this deflection angle command signal is generated, and then, an actual deflection angle that is obtained as a result of the control surfaces provided on the airframe being moved based on the generated deflection angle command signal is acquired, and a deflection angle predictive value representing a deflection angle that is predicted based on the deflection angle command signal assuming that the airframe is in the normal state is computed. Based on these differences, the control surface failure/damage detection device of the present modification judges the possibility of control surface damage based on the abnormality detection result obtained from the optical fiber or the like and judges the possibility of control surface failure based on the actual deflection angle and the deflection angle predictive value. Therefore, the control surface failure/damage detection device is not necessarily required to include the failure/damage steering device 5B. The other configuration is the same as that of the above-described control surface failure/damage detection device, so a further description thereof will be omitted, and only the differences will be described below.

An optical fiber or an electric wire for detecting distortion of or damage to an airframe is laid on an outer surface or in an outer layer of the airframe of an aircraft to which the control surface failure/damage detection device of the present modification is applied (not shown). If distortion occurs in the airframe, the transmitted light quantity of the optical fiber or the resistance of the electric wire changes, and if damage occurs to the airframe, light is not transmitted or electrical continuity is broken. For this reason, the optical fiber or the electric wire is connected to a detection sensor that detects an abnormality based on the transmitted light quantity or the resistance.

The failure/damage possibility judging unit 12 is connected to the sensor information acquisition unit 6, the deflection angle command signal generation unit 5, the aerodynamic coefficient estimate determination unit 8, the flight control system 2, and the control surface failure/damage detection unit 15 and can exchange various types of information with these units. The failure/damage possibility judging unit 12 stores a control surface movement model in advance. Here, a control surface movement model refers to a mathematical model of a control surface movement system including the actuator system and can be obtained during design of an aircraft to which the control surface failure/damage detection device can be applied, and if the control surfaces are in the normal state, a deflection angle that is obtained as a result of the control surfaces being moved based on a given deflection angle command signal can be computed from the control surface movement model. For this reason, during a flight of the aircraft, the failure/damage possibility judging unit 12 continuously computes a deflection angle predictive value representing a deflection angle that is predicted assuming that the airframe is in the normal state, from the control surface movement model and either a deflection angle command signal for changing or maintaining the airframe to or in a desired attitude during the flight of the aircraft or a superimposed deflection angle command signal obtained by superimposing a deflection angle command signal for checking failure/damage on this deflection angle command signal. At the same time, the failure/damage possibility judging unit 12 acquires the actual deflection angle of the airframe during the flight based on either the deflection angle command signal for changing or maintaining the airframe attitude during the flight of the aircraft or the superimposed deflection angle command signal obtained by superimposing the deflection angle command signal for checking failure/damage on this deflection angle command signal, as the sensor information from the sensor information acquisition unit 6.

When judging the possibility of failure/damage, the failure/damage possibility judging unit 12 accepts the detection result from the detection sensor and judges the possibility of control surface damage. That is to say, if the detection result obtained from the detection sensor is abnormal, it is judged that there is a possibility that control surface damage may occur, and if the detection result is normal, it is judged that there is no possibility that control surface damage may occur.

Moreover, the failure/damage possibility judging unit 12 accepts input of either the deflection angle command signal for changing or maintaining the airframe attitude or the superimposed deflection angle command signal obtained by superimposing the deflection angle command signal for checking failure/damage on this deflection angle command signal, which has been output from the flight control system 2, and acquires the deflection angle that is obtained as a result of the control surfaces 3 being moved in accordance with the deflection angle command signal from the sensor information acquisition unit 6. Then, the failure/damage possibility judging unit 12 compares the computed deflection angle predictive value with the deflection angle and judges whether or not there is a possibility that any of the control surfaces 3 may suffer a failure based on the difference between the deflection angle predictive value and the deflection angle.

That is to say, if the difference exceeds a predetermined threshold, it is judged that there is a possibility that any of the control surfaces 3 may suffer a failure, and if the difference does not exceed the threshold, it is judged that there is no possibility that any of the control surfaces 3 may suffer a failure.

If it is judged that there is a possibility that the control surfaces 3 may suffer failure/damage, the failure/damage possibility judging unit 12 accepts input of a deflection angle command signal for aerodynamic coefficient estimation from the aerodynamic coefficient estimation steering device 5A and outputs the deflection angle command signal for aerodynamic coefficient estimation to the flight control system 2, and then, the aerodynamic coefficient estimation device 10 estimates the aerodynamic coefficients and the control surface failure/damage detection unit 15 detects the failure of or damage to the control surfaces 3.

If it is detected that the control surfaces 3 suffer a failure or damage, the detection result is output to the flight control system 2, the display device 16, the deflection angle command signal generation unit 5, and the failure/damage possibility judging unit 12. The deflection angle command signal generation unit 5 and the failure/damage possibility judging unit 12 accumulate the failure/damage detection result and the aerodynamic differential coefficient estimates in case the failure of or the damage to the control surfaces 3 worsens, and the accumulated detection result and estimates are reflected in the next judgement of the possibility of failure/damage.

As described above, the possibility of control surface damage is judged based on the abnormality detection result obtained from the optical fiber or the electric wire, and the possibility of control surface failure is judged based on the actual deflection angle during flight and the deflection angle predictive value that is predicted assuming that the airframe is in the normal state. Thus, a failure of or damage to a control surface can be accurately detected by continuously monitoring control surface failure/damage while minimizing unwanted motion such as unwanted swaying of the airframe and thereby reducing the discomfort for the passengers.

It should be noted that to judge the possibility of failure/damage, in addition to judgement of the possibility based on the result of comparison between the kinetic state quantity predictive values based on the airframe motion model and the actual kinetic state quantities and judgement of the possibility based on the abnormality detection result obtained from the optical fiber or the electric wire and the result of comparison between the deflection angle predictive value based on the control surface movement model and the actual deflection angle, judgement of the possibility based on kinetic state quantities that are obtained as a result of movement in accordance with a deflection angle command signal for checking failure/damage output from the above-described failure/damage checking steering device 5B may also be performed.

Figure 6:
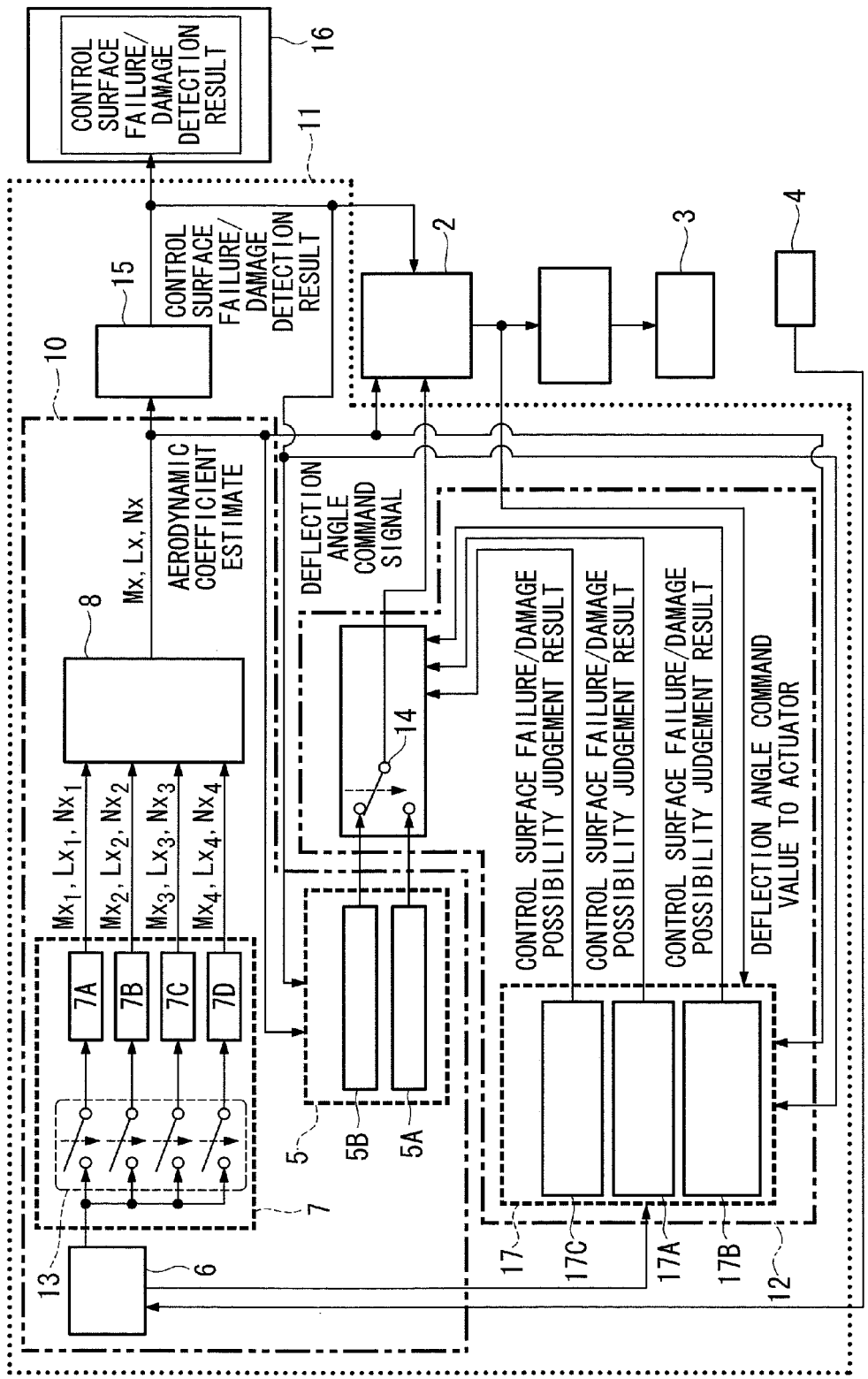
FIG. 6 is a block diagram schematically showing the configuration of a control surface failure/damage detection device according to a reference example of the present invention.

This can be realized by, for example, providing a control surface failure/damage detection device with a configuration as shown in FIG. 6. Specifically, the control surface failure/damage detection device is provided with a failure/damage possibility judgement logic unit 17 including a computing device 17A that stores information related to judgement of the possibility based on the result of comparison between the kinetic state quantity predictive values based on the airframe motion model and the actual kinetic state quantities, a computing device 17B that stores information related to judgement of the possibility based on the abnormality detection result obtained from the optical fiber or the electric wire and the result of comparison between the deflection angle predictive value based on the control surface movement model and the actual deflection angle, and a computing device 17C that stores information related to judgement of the possibility based on the kinetic state quantities that are obtained as a result of movement in accordance with the deflection angle command signal for checking failure/damage. Then, the connection between the failure/damage possibility judgement logic unit 17 and the changeover switch 14 is changed so that judgement of the possibility can be performed based on any one of the judgement methods, and thus, judgement of the possibility is performed as desired. The connection can be changed successively thereafter so that, for example, judgement of the possibility based on another method can be performed as appropriate to enable judgement of the possibility to be performed based a combination of two or three judgement methods.

{Reference Signs List}
1 Aerodynamic coefficient estimation device
2 Flight control system
3 Control surface
4 Sensor
5 Deflection angle command signal generation unit (deflection angle command signal generation means)
6 Sensor information acquisition unit (kinetic state quantity acquisition unit)
7 Candidate value calculation unit (candidate value calculation means)
8 Aerodynamic coefficient estimate determination unit (aerodynamic coefficient estimate determination means)
10 Aerodynamic coefficient estimation device
11 Control surface failure/damage detection device
12 Failure/damage possibility judging unit (failure/damage possibility judging means)
13 Changeover switch
14 Changeover switch
15 Control surface failure/damage detection unit (control surface failure/damage detection means)
16 Display device
17 Failure/damage possibility judgement logic unit
17A, 17B, and 17C Computing device

The invention claimed is:

1. An aerodynamic coefficient estimation device comprising:
a deflection angle command signal generation unit that generates a deflection angle command signal for estimating an aerodynamic coefficient indicating an aerodynamic characteristic of an airframe;
a kinetic state quantity acquisition unit that acquires a kinetic state quantity of the airframe that is obtained as a result of a control surface provided on the airframe being moved based on the deflection angle command signal;
a candidate value calculation unit that calculates candidate values for estimating the aerodynamic coefficient from the kinetic state quantity using two or more different estimations; and
an aerodynamic coefficient estimate determination unit that determines an aerodynamic coefficient estimate based on the candidate values.

2. The aerodynamic coefficient estimation device according to claim 1, wherein the aerodynamic coefficient estimate determination unit determines an average or a median of the candidate values as an aerodynamic coefficient estimate.

3. The aerodynamic coefficient estimation device according to claim 1, wherein the aerodynamic coefficient estimate determination unit determines a candidate value corresponding to one of reproduced values of the kinetic state quantity that are computed respectively based on the candidate values as an aerodynamic coefficient estimate, the one reproduced value being the closest to the kinetic state quantity.

4. A control surface failure/damage detection device comprising:
a failure/damage possibility judging unit that judges the possibility of control surface failure/damage;
the aerodynamic coefficient estimation device according to claim 1; and
a control surface failure/damage detection unit that detects which control surface suffers a failure or damage based on an aerodynamic coefficient estimate estimated by the aerodynamic coefficient estimation device if the failure/damage possibility judging unit judges that there is a possibility that control surface failure/damage may occur.

5. The control surface failure/damage detection device according to claim 4,
wherein the failure/damage possibility judging unit includes:
another deflection angle command generation unit that generates a deflection angle command signal for moving the control surface such that the airframe makes no motion; and
another kinetic state quantity acquisition unit that acquires a kinetic state quantity of the airframe that is obtained as a result of the control surface provided on the airframe being moved based on the deflection angle command signal, and
the possibility of control surface failure/damage is judged based on the kinetic state quantity.

6. The control surface failure/damage detection device according to claim 4,
wherein the failure/damage possibility judging unit includes:
still another deflection angle command signal generation unit that generates a deflection angle command signal for changing or maintaining the airframe to or in a desired attitude;
still another kinetic state quantity acquisition unit that acquires a kinetic state quantity of the airframe during a flight based on the deflection angle command signal; and
a kinetic state quantity prediction unit that computes a kinetic state quantity predictive value representing a kinetic state quantity that is predicted assuming that the airframe is in a normal state, and
the possibility of control surface failure/damage is judged based on the kinetic state quantity and the kinetic state quantity predictive value.

7. The control surface failure/damage detection device according to claim 4, comprising:
an optical fiber or an electric wire laid on the airframe; and
a detection unit that detects an abnormality of the optical fiber or the electric wire,
wherein the failure/damage possibility judging unit includes:

still another deflection angle command signal generation unit that generates a deflection angle command signal for changing or maintaining the airframe to or in a desired attitude;

a deflection angle acquisition unit that acquires a deflection angle that is obtained as a result of the control surface provided on the airframe being moved based on the deflection angle command signal; and a deflection angle prediction unit that computes a deflection angle predictive value representing a deflection angle that is predicted based on the deflection angle command signal assuming that the airframe is in a normal state, and the possibility of damage to the control surface is judged based on the detection result of the detection unit, and the possibility of a failure of the control surface is judged based on the deflection angle and the deflection angle predictive value.

8. The control surface failure/damage detection device according to claim 4, wherein the control surface failure/damage detection unit detects a failure of or damage to the control surface by comparing the aerodynamic coefficient estimate with either an aerodynamic coefficient estimate of the airframe in a normal state or an aerodynamic coefficient estimate that was obtained when failure/damage detection was performed the previous time.

* * * * *